June 28, 1927.
G. C. GEANOPULOS
BUMPER
Filed Aug. 10, 1925
1,633,782
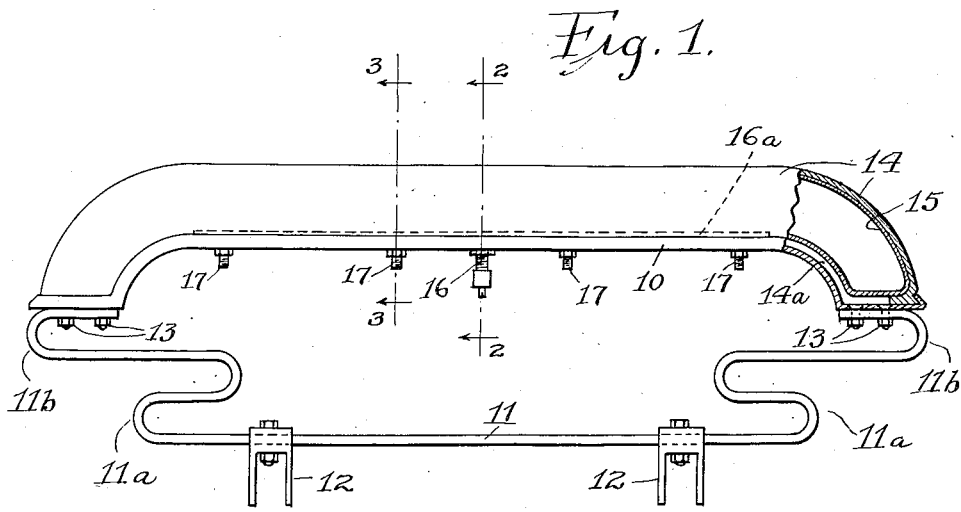
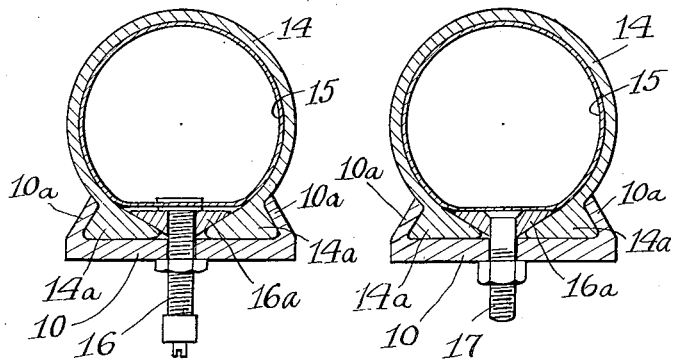 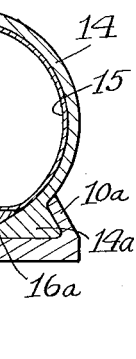
INVENTOR
GEORGE C. GEANOPULOS
BY Albert E. Bell
ATTORNEY Patented June 28, 1927.

1,633,782

UNITED STATES PATENT OFFICE.

GEORGE C. GEANOPULOS, OF EVANSTON, ILLINOIS.

BUMPER.

Application filed August 10, 1925. Serial No. 49,250.

My invention relates to an improved construction of bumper for use on motor vehicles, by which two distinct cushioning effects are produced, one being relatively yielding and readily responsive to slight impacts, to the end that if perchance the bumper should strike a person the injury done the person will be relatively small, and the other being relatively stiff and yet of a yielding nature to protect the vehicle in the event of collision with other vehicles or rigid obstructions.

More specifically, my invention consists of a bumper construction by which a pneumatic cushion is supported on the outer part of the bumper by a strong and relatively rigid metal member, to receive the initial impact in the event of a collision with a person, vehicle or rigid obstruction, my bumper further consisting of a spring structure for supporting the mounting member of the pneumatic cushion from the end of a vehicle, so that the mounting member may yield under the impact, if it be of a serious nature and so prevent injury to the vehicle carrying the bumper and also to the vehicle or obstruction collided with.

My invention will best be understood by reference to the accompanying drawings showing a preferred embodiment thereof in which Fig. 1 shows my complete bumper construction in plan view and partially in horizontal sectional view to show the inner construction thereof at one end, Fig. 2 is a sectional view to an enlarged scale of the pneumatic cushion construction forming a part of my bumper, taken along the line 2—2 in Fig. 1, and Fig. 3 shows in a view similar to Fig. 2 a section of the pneumatic cushion construction taken along the line 3—3 in Fig. 1.

Similar numerals refer to similar parts throughout the several views.

As shown in Fig. 1, my bumper construction consists of a mounting member 10 which is preferably of metal and of sufficient size in cross section to be relatively stiff against impacts of collision, which member is supported in horizontal position across the end of a vehicle by a flat spring member 11, clamping devices 12 being preferably employed to secure the mid portion of the spring member 11 to the end of a vehicle in any convenient way common in the art. Adjacent its mid portion, the spring member 11 is preferably formed outside of the clamping devices, into S shaped loops as indicated at 11$^a$ from which the ends of the spring member extend substantially parallel with its mid portion and are provided with return bends as indicated at 11$^b$, so that the extreme ends of the spring member 11 lie against the end portions of the mounting member 10 to which they are secured by means of bolts 13 as indicated.

The structure thus far described will serve admirably under some conditions as a bumper for vehicles, the cross section and material of the spring member 11 being purposely taken to withstand impacts likely to be encountered in collision with other vehicles and obstructions. In the past however, it has frequently been found that where a bumper of the class thus far described is used, the relative stiffness and rigidity of the bumper resulting from the necessity of making it stiff and strong enough to withstand maximum impacts, are such as to be practically ineffective in cushioning slight impacts, and particularly ineffective in the case of collision with a person, as a result of which collision between such a bumper and a person produces nearly but not quite as serious results to the person, as though he had been hit by a rigid portion of the vehicle itself.

By my invention I not only provide a bumper to withstand heavy impacts with other vehicles and obstructions, but also a construction well adapted to yield on slight impacts, for example with persons, as follows: The mounting member 10, as more clearly shown in Figs. 2 and 3 is provided along its upper and lower edges with inturned lips 10$^a$ to receive the edge clincher portions of a casing 14, made preferably of fabric and rubber in a manner similar to the construction of casings of pneumatic tires. The member 10 is preferably curved at its ends as indicated and the casing 14 is formed with substantially the same curvature at its ends, so that impacts may be cushioned which are directed obliquely of the vehicle at the ends of the bumper, as well as impacts which are directed towards the vehicle at the mid portion of the bumper. The lips 10$^a$ extend around the curved ends of the mounting member 10 to and across its end portions, the lugs or clincher portions 14$^a$ of the casing 14 being similarly continued so that the casing is firmly held in engagement with the mounting member throughout its entire length. The casing 14 contains an inner tube 15, provided with a valve stem 16 at its mid portion extending through the mounting member 10 to fill the inner tube with air under pressure as desired. An important feature of my invention consists in positively retaining the casing 14 on the mounting member 10 which is accomplished as follows: The casing 14 is of course necessarily constructed to permit the insertion of the inner tube 15, and to that end is split between the portions 14ª of the casing engaging the lips 10ª, in a manner common in tire construction. To insure that the portions 14ª shall not be pulled from engagement with the lips 10ª when a collision impact is in a direction tending to roll the casing 14 on its mounting member 10, I provide a clamping bar 16ª in the casing, of a sufficient width to overlap the portions 14ª of the casing, the bar preferably having beveled edges as indicated in Figs. 2 and 3, so that the inner surface of the bar and the inner surface of the casing form a smooth continuous surface to be engaged by the inner tube 15. At intervals throughout its length the bar 16ª has rigidly secured thereto, the inner ends of retaining studs 17 which extend through the mounting member 10 to which they are rigidly secured by nuts threaded on them as indicated in Figs. 1 and 3. The retaining bar 16ª extends throughout the straight central portion of the mounting member 10 and the studs 17 are purposely taken of a length permitting the portions 14ª of the casing 14, to be inserted under the lips 10ª after the inner tube 15 is placed in the casing in deflated condition, after which the studs 17 are drawn through the member 10 and securely held in place as described, thus making it impossible to remove the casing from the member 10 without tearing the casing. The inner tube 15 is preferably made of the same shape as the casing 14 and may be inflated with air under any desired pressure, so that the casing may have any desired degree of resilience to slight impacts, which condition may of course be readily adjusted so that as long as the impact is not of such a serious nature to press the outer or forward wall of the casing completely against the opposite wall, produces little if any shock either to the vehicle or the person or thing collided with, and thus affords a measure of protection both to the vehicle and to the person or thing collided with, of an entirely different nature from that resulting from bumper constructions ordinarily employed. At the same time however, where my bumper experiences a serious collision, the casing 14 is collapsed by the impact which is then brought to bear directly on the member 10, which for the reasons above stated serves to cushion these impacts effectively and to protect the vehicle and the thing collided with.

While I prefer to employ a pneumatic construction for the withstanding of slight impacts of collision, it will be understood that this feature of my invention need not necessarily be pneumatic, but that other constructions may be employed.

While I have shown my invention in the particular embodiment above described, it will be understood that I do not limit myself to this exact construction as I may employ equivalents known to the art at the time of the filing of this application without departing from the scope of the appended claims.

What I claim is:

1. In a bumper, the combination of a mounting member to extend horizontally across the end of a vehicle, said member having lips extending towards each other along its upper and lower edges to support a cushioning element, a pneumatic casing having edge extensions engaging under said lips to hold said casing on said member, a pneumatic tube in said casing, and a retaining bar in said casing between its edge extensions clamping said casing in place on said member.

2. In a bumper, the combination of a mounting member to extend horizontally across the end of a vehicle, said member having lips extending towards each other along its upper and lower edges to support a cushioning element, a hollow radially yieldable resilient element having edge portions under said lips, and a retaining bar in said element between its edge portions clamping the latter to said member.

3. In a bumper, the combination of a mounting member having edge flanges extending therefrom to engage a cushioning member, a resilient cushioning member having separated edge extensions engaging said flanges, said edge extensions having inner surfaces diverging outwardly from said mounting member, and a retaining bar between said edge extensions and engaging said diverging surfaces.

4. In a bumper, the combination of a mounting member having edge flanges extending therefrom to engage a cushioning member, a resilient cushioning member having separated edge extensions engaging said flanges, said edge extensions being each of greater thickness at its outer edge than adjacent said cushioning member, and a retaining bar between said edge extensions and engaging them adjacent said cushioning member.

5. In a bumper, the combination of a mounting member having edge flanges extending therefrom to engage a cushioning member, a resilient cushioning member having separated edge extensions engaging said flanges, each of said edge extensions having side faces diverging towards its outer edge, and a retaining bar between said edge extensions and engaging their adjacent side faces.

6. In a bumper, the combination of a mounting member having edge clincher flanges extending therefrom, a pneumatic casing having separated edge extensions fitting said flanges, and a retaining bar between said edge extensions restraining their disengagement from said flanges.

7. In a bumper, the combination of a mounting member having edge flanges with inner faces converging outwardly from said member, a retaining bar carried by said member and having edge faces spaced from said flanges and diverging outwardly from said member, and a cushioning member having edge extensions substantially filling the spaces between said mounting member, its flanges and said bar.

8. In a bumper, the combination of a mounting member having edge flanges with inner faces converging outwardly from said member, a retaining bar carried by said member and having edge faces spaced from said flanges and diverging outwardly from said member, and a pneumatic casing having its edge portions extended between said flanges and said retaining bar and thickened to substantially fill the spaces between said mounting member, its flanges and said bar.

In witness whereof, I hereunto subscribe my name this 5th day of August, A. D. 1925.

GEORGE C. GEANOPULOS.